United States Patent
Begun et al.

[11] Patent Number: 5,884,094
[45] Date of Patent: Mar. 16, 1999

[54] COMPUTER SYSTEM FOR DETECTING AND ACCESSING BIOS ROM ON THE LOCAL OR PERIPHERAL BUS

[75] Inventors: Ralph Murray Begun, Raleigh, N.C.; William Robert Greer, Waterville; Christopher Michael Herring, Essex Junction, both of Vt.

[73] Assignee: International Business Machines Corporation, Armonk, N.Y.

[21] Appl. No.: 53,986

[22] Filed: Apr. 2, 1998

Related U.S. Application Data

[62] Division of Ser. No. 837,756, Apr. 22, 1997, Pat. No. 5,802,393, which is a division of Ser. No. 706,934, Sep. 3, 1996, Pat. No. 5,680,556, which is a continuation of Ser. No. 387,383, Feb. 13, 1995, abandoned, which is a continuation of Ser. No. 152,221, Nov. 12, 1993, abandoned.

[51] Int. Cl.$^6$ ............................................. G06F 13/14
[52] U.S. Cl. ........................... 395/830; 395/281; 395/652
[58] Field of Search ...................... 395/651, 652, 395/653, 281, 306, 308, 309, 830, 831, 828

[56] References Cited

U.S. PATENT DOCUMENTS

| | | | |
|---|---|---|---|
| 5,471,674 | 11/1995 | Stewart et al. | 395/652 |
| 5,522,086 | 5/1996 | Burton et al. | 395/829 |
| 5,574,869 | 11/1996 | Young et al. | 395/306 |

*Primary Examiner*—Krisna Lim
*Assistant Examiner*—Viet Vu
*Attorney, Agent, or Firm*—Bernard D. Bogdon

[57] ABSTRACT

A personal computer system is provided which includes a CPU, with the CPU being operable by a BIOS including initialization or booting instructions. The system includes a local bus and a peripheral bus. A bus interface chip, including a memory controller/peripheral bus host bridge (MC/PBHB) interconnects the local bus and the peripheral bus, and includes a latch which includes as its input clock cycles generated by the CPU. The initialization instructions of the BIOS are contained in a non-volatile ROM module located to write onto either the local bus or the peripheral bus. The MC/PBHB unit is able to decode and handle ROM cycles and is configured to either pass or not pass ROM read cycles depending upon certain control states that identify whether the ROM is located on the local bus or the peripheral bus. Logic is provided to detect during the first ROM CPU cycle whether the ROM is on the peripheral bus or on the local bus, and the MC/PBHB will then either pass the signal to the peripheral bus if that is where the ROM is located, or will not pass it—in which case the local bus controller will take over and read the ROM which must be located on the local bus since it is not located on the peripheral bus.

3 Claims, 4 Drawing Sheets

COMPUTER SYSTEM FOR DETECTING AND ACCESSING BIOS ROM ON THE LOCAL OR PERIPHERAL BUS

This application is a divisional of application Ser. No. 08/837,756, filed Apr. 22, 1997, now U.S. Pat. No. 5,802,393, which is a divisional of application Ser. No. 08/706,934, filed Sep. 3, 1996, now U.S. Pat. No. 5,680,556, which is a continuation of application Ser. No. 08/387,383, filed Feb. 13, 1995, now abandoned, which is a continuation of application Ser. No. 08/152,221, filed Nov. 12, 1993, now abandoned.

FIELD OF THE INVENTION

The present invention relates generally to computer system architecture and, more specifically, to a computer system having multiple buses on which ROM-containing initialization code can be located, and wherein logic is provided to detect the location of the ROM and read the code irrespective of the bus on which it is located.

BACKGROUND OF THE INVENTION

Personal computer systems are well known in the art. Personal computer systems in general, and IBM Personal Computers in particular, have attained widespread use for providing computer power to many segments of today's modern society. Personal computers can typically be defined as a desktop, floor-standing, or portable microcomputer that is comprised of a system unit having a single central processing unit (CPU) and associated volatile and non-volatile memory, including all RAM and BIOS ROM, a system monitor, a keyboard, one or more flexible diskette drives, a fixed disk storage device, and an optional printer. One of the distinguishing characteristics of these systems is the use of a mother board or system planar to electrically connect these components together. These systems are designed primarily to give independent computing power to a single user and are inexpensively priced for purchase by individuals or small business. Examples of such personal computer systems are IBM's PERSONAL COMPUTER AT and IBM's PERSONAL SYSTEM/2.

In computer systems, the components communicate via electrical signals. These electrical signals are typically carried by electrical connections between the system components. Typical types of electrical connections include metal traces on a printed circuit board, vias, plated through holes, plugs, and individual wires wrapped from pin to pin of system components. Typically groups of electrical signals and groups of electrical connections that carry the electrical signals are referred to as a "bus." Thus, a reference to a "bus" can indicate a reference to a group of electrical signals, a group of electrical connections that carry the electrical signals, or a reference to both a group of electrical signals that form a protocol and a group of electrical connections that carry the electrical signals. Systems can be said to have a variety of buses. A "local bus" is a bus which is, in general, synchronous with the microprocessor and designed to optimize the performance of the microprocessor. Most systems also have a "peripheral bus," which is either synchronous or asynchronous and may pass data at a slower frequency than the local bus. Peripheral buses typically have a number of interface slots, which are connectors that allow peripheral device cards to be pluggably connected to the peripheral bus. A typical peripheral bus is the peripheral controller interconnect (PCI) bus. Typically the peripheral bus is interfaced to the system local bus with a bus interface circuit (BIC). The BIC interfaces between the system local bus and the peripheral bus, handling any differences in bandwidth, managing control of the buses between busmasters, etc.

Additionally, more than one peripheral bus may be connected to each other.

Many systems also include one or more expansion buses, connected to the peripheral bus. These may also be either synchronous or asynchronous, and typically operate at a slower speed and narrower bandwidth than the peripheral bus. Examples of such expansion buses are IBM Micro Channel bus and ISA bus.

Personal computer systems are typically used to execute software to perform such diverse activities as word processing, manipulation of data via spread-sheets, collection and relation of data in databases, displays of graphics, design of electrical or mechanical systems using system design software, etc.

In these personal computer systems, read only memory (ROM), which is a type of non-volatile data storage device, is used for storing system initialization and boot code. ROM, or as it is sometimes referred to as read only storage (ROS), is a solid state device that allows preprogrammed data or machine code instructions to be retained while the computer is in a power off state and which allows a straight-forward and rapid access to the code once power is applied. For this reason, ROMs are used to store code sequences for the first access of a system processor. These code sequences are then used to test and initialize other portions of a computer system such as main memory, and then allow other programs such as operating systems, etc., to begin execution. This is normally referred to as booting or boot sequences. (It should be noted that ROMs are also sometimes used in other applications within a typical personal computer systems. However, the present invention is related to the use of ROMs that contain the processor's initialization or boot code. EPROM's and EEPROM's can also be used. Thus, unless the context dictates otherwise, the term "ROM" as used herein denotes the ROM, EPROM, or EEPROM containing the initialization code.)

In the early days of personal computer systems, architecture was relative simple and the location of the ROM chips containing the initialization code was dictated by the architecture and thus was located on the expansion local bus. At this point it should be noted that while the initialization code is stored in ROM, it is conventional practice to read the ROM into system memory which is volatile memory, often referred to as random access memory (RAM), since RAMs can operate at a much greater speed than ROMs for the execution of the code. However, as personal computer systems have become more complicated, especially in the IBM Personal System/1 and IBM Personal System/2 family, there is a multiplication of bus systems as indicated above with a multiplication of possible locations for the ROM containing the initialization instructions to be stored. For example, it is possible for the ROM to be located on the CPU local bus, or the ROM could be located directly on the peripheral bus or, as a third possibility, the ROM could be located on the expansion bus. It is the designer of the system who makes the choice as to where the ROM is to be located, and it will be located at only one of these locations. However, it is desirable that a single CPU configuration, programming and memory controller be usable irrespective of where the designer of a particular system chooses to locate the ROM.

There are advantages and disadvantages for the ROM containing the initialization instructions to be located at each of these various places, and hence there is a trade-off of advantages and disadvantages which is made by the system designer when determining where to locate the ROM containing the initialization code. The system designer for one system might choose to locate the ROM in one location, while for another system which is of a similar configuration but with different requirements, he or she may choose another location. As indicated above, there are advantages and disadvantages to each location.

For example, the ROM could be attached directly to the main system processor on the local bus. This would be desirable for a high reliability system such as a server which might use this location for ROM. This location would be chosen because the CPU local bus to ROM connection is the most direct, there being few or no devices between the ROM and the CPU. Thus, the ROM code will be accessible to the CPU even in the event of one or more failures elsewhere in the system. Hence, the CPU in executing the ROM code can diagnose and report almost any device failure within the system. However, there are some disadvantages to locating the ROM on the CPU local bus. One such disadvantage is that the highest performance processors now operate with bus speeds as high as 66 Mhz. ROMs typically do not operate at these speeds; therefore some amount of extra logic is usually required between the ROM and the local bus to compensate for this speed difference. Moreover, any attachments on such a high speed bus will tend to degrade system performance due to the increased number of loads on the high speed bus. Another disadvantage is that modern CPUs employ local bus data widths of 64 bits, while ROMs are typically 8 or 16 data bit widths. This requires even more logic to attach to the ROM.

The designer may choose to connect the ROM to the PCI or other intermediate peripheral bus. This choice might be beneficial for a system which is to be used as a desktop system. This attachment relieves some of the problems associated with attaching to the CPU local bus. For example, the PCI bus operates at a maximum of 33 Mhz, thus being less sensitive to performance degradation from additional attachments. Moreover, the PCI bus is typically limited to 32 bits data widths, thus reducing the amount of ROM interface logic required. The advantage of this attachment is that it still affords some degree of isolation of the CPU from the ROM since the PCI bus is not widely used for general purpose or customer-installed option attachments when there is one or more expansion bus. However, the disadvantage of this attachment is similar to that of the CPU local bus, except that the degree of the problem is reduced.

Lastly, the ROM can be located on the expansion bus, which generally may be Micro Channel architecture of the type used in certain IBM personal computers, namely, the IBM Personal System, PC's or an ISA bus. This connection is desirable to be used in the lowest cost personal computers since the ROM interface can be the simplest. This is because the ISA or Micro Channel bus both support 8-bit or 16-bit data widths directly and since the expansion bus speeds typically closely match the average speed of the low cost ROM devices. The disadvantage to this connection, of course, is that the ROM is furthest removed from the main processor, thus being susceptible to the failure of a large number of system components which would prevent its operation.

The problem presented to the architect of the memory controller is to allow the system to place the ROM in any one of these locations without having to provide a custom program or special hardware control for each location or require operator intervention for location selection. Expressed another way, the problem confronting the memory control architect is to provide a single CPU protocol or system which will allow the ROM chip having the initialization instructions to be located at any one of these three locations, i.e., on the local bus, on the PCI or equivalent bus or on the expansion bus, without having to modify the memory controller or the CPU.

SUMMARY OF THE INVENTION

A personal computer system is provided which includes a CPU, with the CPU being operable by a BIOS which includes initialization or booting instructions. The system includes a local bus and a peripheral bus. A bus interface chip, including a memory controller/peripheral bus host bridge (MC/PBHB) interconnects the local bus and the peripheral bus, and includes a latch which includes as its input clock cycles generated by the CPU. The initialization instructions of the BIOS are contained in a non-volatile ROM module located to write onto either the local bus or the peripheral bus. The MC/PBHB unit is able to decode and handle ROM cycles and is configured to either pass or not pass ROM read cycles depending upon certain control states that identify whether the ROM is located on the local bus or the peripheral bus. Logic is provided to detect during the first ROM CPU cycle whether the ROM is on the peripheral bus or on the local bus, and the MC/PBHB will then either pass the signal to the peripheral bus if that is where the ROM is located, or will not pass it—in which case the local bus controller will take over and read the ROM which must be located on the local bus since it is not located on the peripheral bus.

The latch, which is responsive to various signals, allowing access from the CPU to the peripheral bus through the MC/PBHB if the ROM is detected on the peripheral bus and blocks access of the signal to the peripheral bus if the ROM is not located on the peripheral bus, thus indicating that the ROM is on the local bus. If the ROM is on the local bus, a local bus controller takes over. If the ROM is on the peripheral bus, the MC/PBHB takes over. In either case the CPU is accessing the ROM to read the instructions therefrom without the necessity of user-operated switches or special CPU programming. Additionally, an expansion bus may be connected to the peripheral bus by a bus bridge, and the ROM may be located on the expansion bus.

DESCRIPTION OF THE PREFERRED EMBODIMENT(S)

Figure 1:
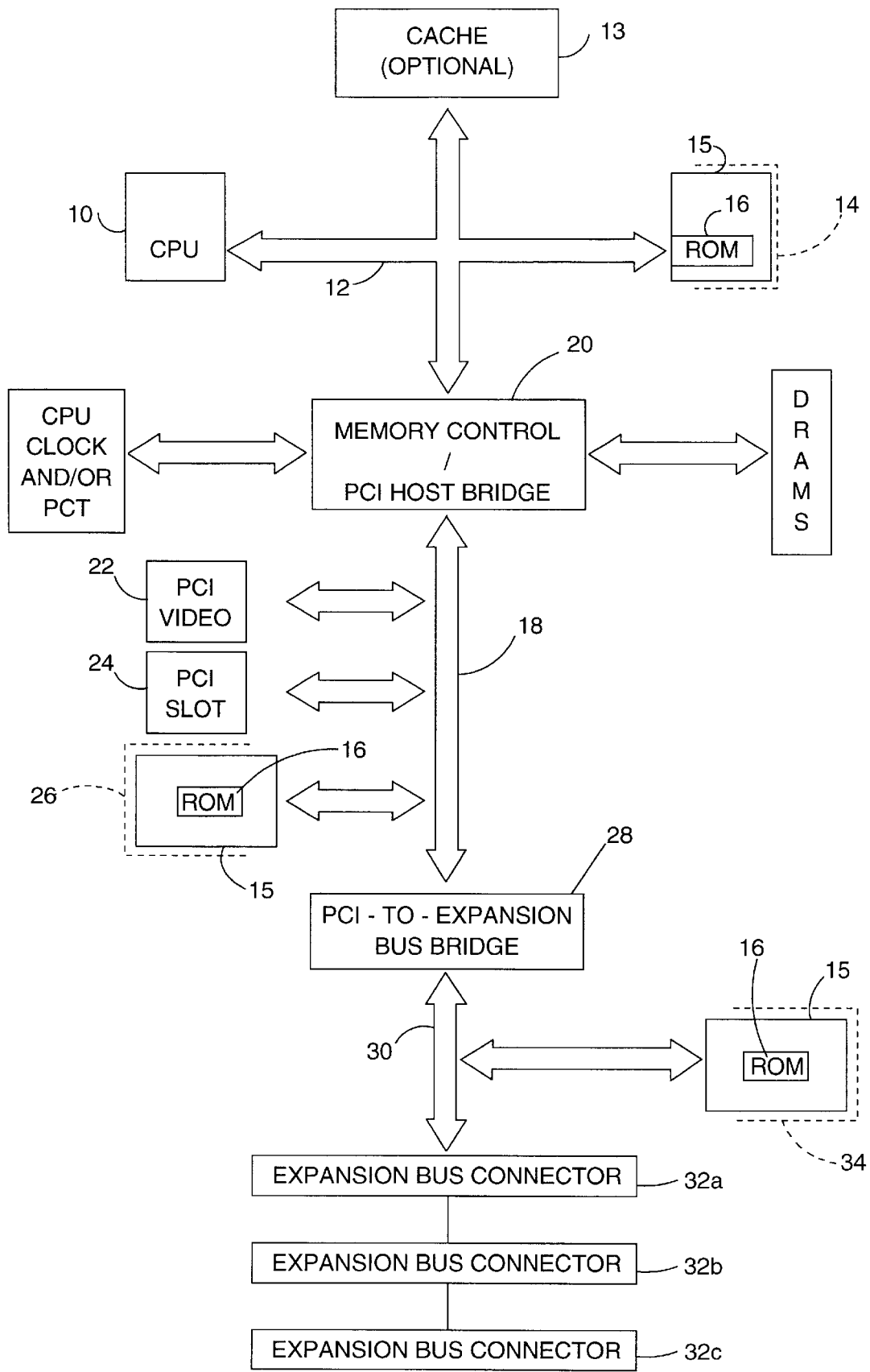
FIG. 1 is a block diagram showing a typical configuration of a personal computer system incorporating the present invention.

Referring now to the drawings and for the present to FIG. 1, a typical personal computer system is shown with the components being represented in block diagram form. The various components and buses typically are formed on a system board or mother board, which are well known and thus not shown. This board provides the necessary wiring, card slots and other connection and various circuit components, such as capacitors and resistors, to form the system. A personal computer system typically contains a CPU 10, based on a microprocessor such as an Intel 80386 or 80486. The CPU 10 is connected to a CPU local bus 12, which also may have cache memory 13 connected thereto. The CPU local bus 12 also includes a slot 14 for physically locating a card 15 having a ROM chip 16 or a group of ROM chips thereon, which card can be plugged into the slot 14 on the local bus 12. This is one of the optional locations for the ROM chip containing the BIOS initialization code and thus this box is shown in dotted form as will be the other optional slots or sockets. It should be noted that using a card and slot or socket connection is just one type of connection that can be used for the ROM. Others include plugging a packaged ROM into a circuit board, or using other types of connections for packaged ROMs. As was indicated previously, the ROM chip 16 can be located on any one of several buses, the local bus being one of them, but it will not be on any more than one bus in any given system design.

The local CPU bus 12 is connected to a peripheral bus 18 which in the preferred embodiment is the peripheral controller interconnect (PCI) bus by memory controller/peripheral bus host bridge (MC/PBHB) logic chip 20. The bus specification for the configuration and signals on the PCI bus and interface or bridge are described in published document entitled "PCI-Local Bus Specification, Rev. 2.0" dated Apr. 30, 1993.

Various devices can be connected to the peripheral bus, such as a video device 22, and other slots 24 can be provided for addition of other I/O devices. A slot 26 for the connection of the card 15 having the ROM chip 16 is also provided, this being a second option for the connection of the ROM chip. This connection is to the PCI bus 18 rather than to the local CPU bus 12.

In some systems, e.g., certain laptop computers, the local bus 12 and the peripheral bus 18 constitute the entire bus system of the personal computer. However, in other systems, one or more expansion buses are provided. As shown in FIG. 1, in one embodiment of this invention the PCI bus is connected through PCI-to-expansion bus bridge 28 to an expansion bus 30. The expansion bus can be either a bus incorporating Micro Channel architecture or an ISA bus. A suitable expansion bus bridge for the ISA to PCI bus is Intel Part No. 82378IB.

Various slots 32*a*, 32*b* and 32*c*, are provided for connecting different devices onto the expansion bus. Additionally, a slot 34 for connecting card 15 having ROM 16 is provided on the expansion bus 30. This is the third spot for the possible connection of the ROM module containing the BIOS code having the initialization instructions or code. As was indicated previously, slots 14, 26 and 34 are shown in dotted lines to indicate that there is not a card 15 containing a ROM chip 16 contained in each of those locations, but each of them is available for the positioning of a card 15 containing a ROM chip 16 depending upon the configuration decided upon by a system designer utilizing the type of system architecture shown herein.

To allow the ROM to be located on any of these buses 12, 18 or 30, the present invention makes use of and manipulates the signals which are generated by the CPU and various other system components, including those components on the planar board, and by the memory controller and peripheral host bridge logic chip 20 and by devices on the peripheral bus and on the peripheral to expansion bus bridge 28. These signals are all documented and exist within the system in the references described above. By adding a few logic devices to the MC/PBHB logic chip 20 interconnection, these signals can be manipulated in such a way so as to indicate the location of the ROM and then read the ROM containing initialization instructions to the CPU 10 from wherever it is located.

The signals shown in FIGS. 2A–2E show how these signals are manipulated and utilized to determine the location of the ROM device and the control of the reading of the ROM. First it should be noted that the specification for the PCI bus indicates the various signals that are available on the PCI bus at the MC/PBHB logic chip 20. The signals that are relevant to the present invention are shown in FIGS. 2A–2E in various configurations.

Figure 2A:
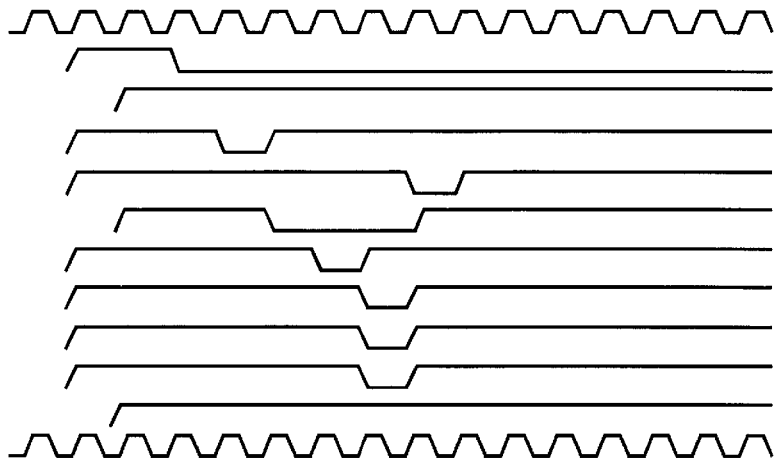
FIGS. 2A through 2E show various signal patterns generated by a personal computer system according to this invention.

Referring now to FIG. 2A, CLK indicates the clock signal which is available from the system, and RESET indicates a reset signal which on reset first goes high and then defaults low. The next signal is the ROM on PCI signal, which is the signal which will control whether the CPU reads the PCI bus for the ROM or reads the local bus for the ROM. This signal is generated internal to the memory controller logic. When this signal is high, the ROM is on the PCI bus, when it is low, the ROM is on the local bus. It should be noted at this point that if the ROM is indicated to be on the PCI bus, that indicates that the ROM is either connected directly to the PCI bus or it may be connected to the expansion bus. If it is directly on the PCI bus, the MC/PBHB logic Chip 20 will directly handle the reading of the ROM. If it is on the expansion bus, the PCI to expansion bus bridge logic which is published in the Intel 82378IB PCI to ISA bus chip documentation will handle memory in the same way that the CPU will read the data from any other device on the expansion bus through both the PCI to expansion bus bridge and the MC/PBHB logic chip 20.

The MC/PBHB logic chip 20 according to protocol will pass the first ROM access signal after reset to the PCI bus. If the CPU has requested a ROM read cycle, the eROM-SEL$ provided by the MC/PBHB logic chip 20 will go active. As used herein and according to convention, a "$" after a signal designation means "active low". The ROM address will be presented on the PCI bus according to PCI bus protocol, together with control signals to indicate that a memory read cycle is requested. According to PCI bus protocol, an attached device must activate the DEVSEL$ contact, within three clock cycles for an active decode, after the address phase for that cycle. If detected, the ROM on PCI is latched active (such a latch is in the MC/PBHB as will be described presently). If the DEVSEL$ is not detected within three clock cycles, the ROM on PCI bus signal will go inactive, indicating the ROM is not on the PCI bus, but rather on the local bus, and will remain so until reset. The ROMSEL$ signal driven from the MC/PBHB can be used by the PCI bus device as an address decode to allow a DEVSEL$ within the three clock cycles after the address phase.

The ADS$ signal is a CPU local bus signal which indicates the start of the bus cycle, and the RDY$ signal driven by the MC/PBHB is a signal which ends the process for the previously requested bus cycle. The ROMSEL$ signal is generated by the MC/PBHB. The FRAME$ signal, which is a PCI bus defined signal, is a signal which starts the process of determining whether the ROM is on the PCI or on the local bus. The IRDY$ signal, which is a PCI bus defined signal, is generated by the MC/PBHB. The DEVSEL$ signal is generated by a device on the PCI bus or on the expansion bus, and it is in response to this signal and when it is received with respect to the FRAME$ signal that the decision is made as to whether the ROM is on the PCI bus or on the local bus, TRDY$ signal is a signal indicating the target is ready, and the THIRDCLK$ signal is a signal generated by logic which will be described presently. It is the THIRDCLK$ signal in combination with the DEVSEL$ signal which determines whether the ROM is on the PCI bus or on the local bus. This is accomplished essentially in the following manner. Once the FRAME$ signal is initiated, the memory controller looks for a DEVSEL$ signal on the PCI bridge. If a DEVSEL$ signal signifying that the ROM is on the PCI bridge is not received within 3 CLK cycles, then the logic circuit will determine that the ROM is not on the PCI bus, but rather on the local bus, and will then drive the ROM on PCI signal low, indicating that the ROM is not on the PCI bus and that the read is to take place from the local bus. On the other hand, if a DEVSEL$ signal is received by the memory controller/host bridge within 3 CLK cycles of the FRAME$ signal going active, the ROM on PCI signal will be maintained high, and the MC/PBHB will read the ROM information from the PCI bus.

FIG. 2A shows one configuration in which the ROM is on the PCI bus. As can be seen, when the FRAME$ signal goes low, the DEVSEL$ signal goes low within 1 CLK cycle following the FRAME$ signal going low. This indicates that the ROM is on the PCI bus, and hence the ROM on PCI bus signal stays high indicating that the ROM is on the PCI bus.

Figure 2B:
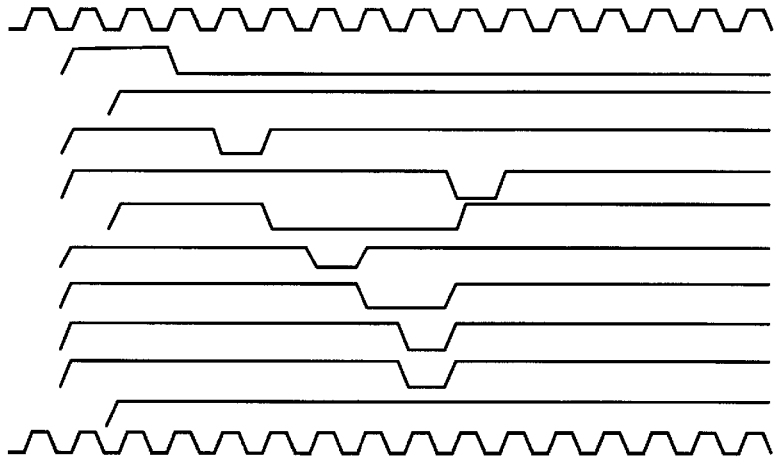

FIG. 2B is similar to FIG. 2A in that when the FRAME$ signal goes low, the DEVSEL$ signal goes low 2 CLK cycles after the FRAME$ signal goes low, again indicating that the ROM is on the PCI bus and the ROM on PCI bus signal stays high.

FIG. 2C again is similar to FIGS. 2A and 2B, in that when the FRAME$ signal goes low, the DEVSEL$ signal goes low 3 CLK cycles following the FRAME$ signal going low. This again indicates that the ROM is on the PCI bus and the ROM on PCI signal stays high.

Figure 2C:
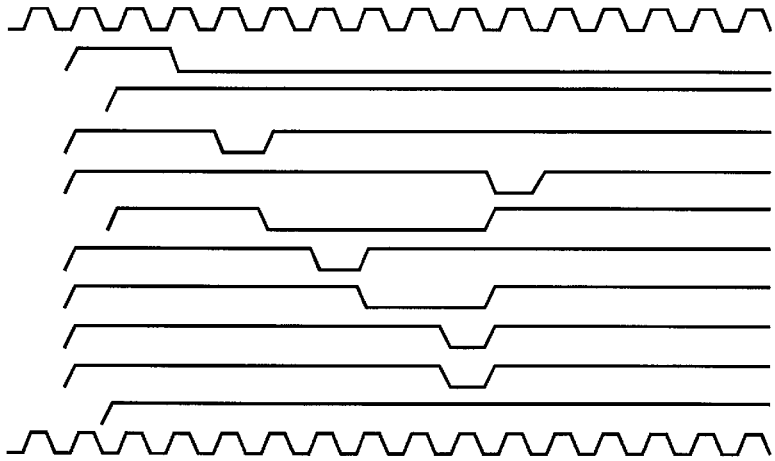
Figure 2D:
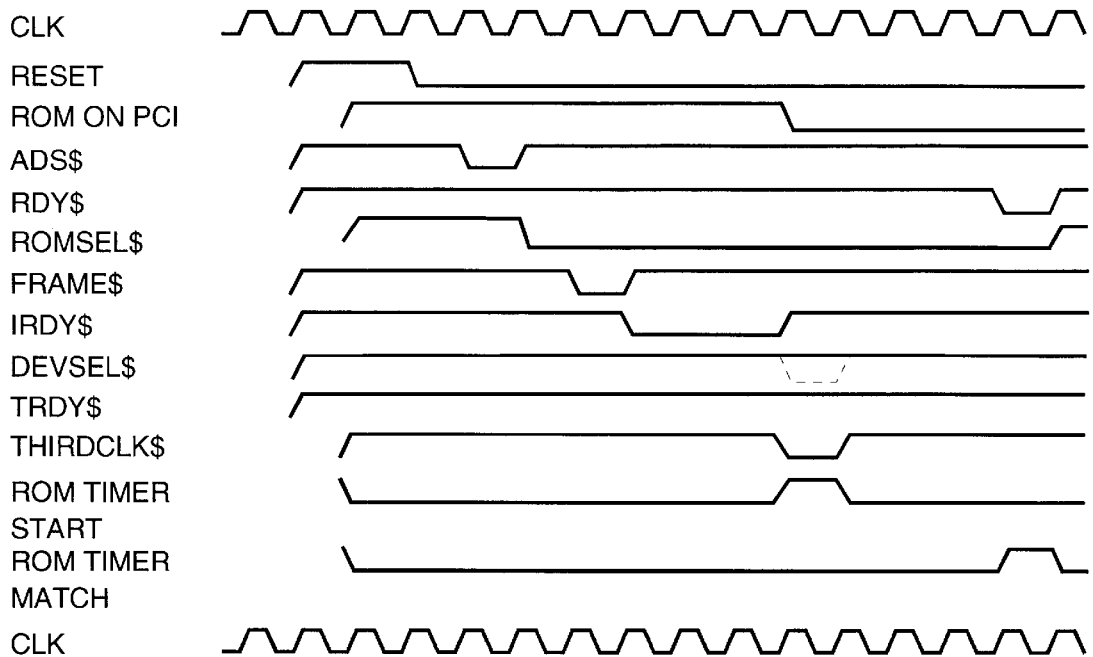
Figure 2E:
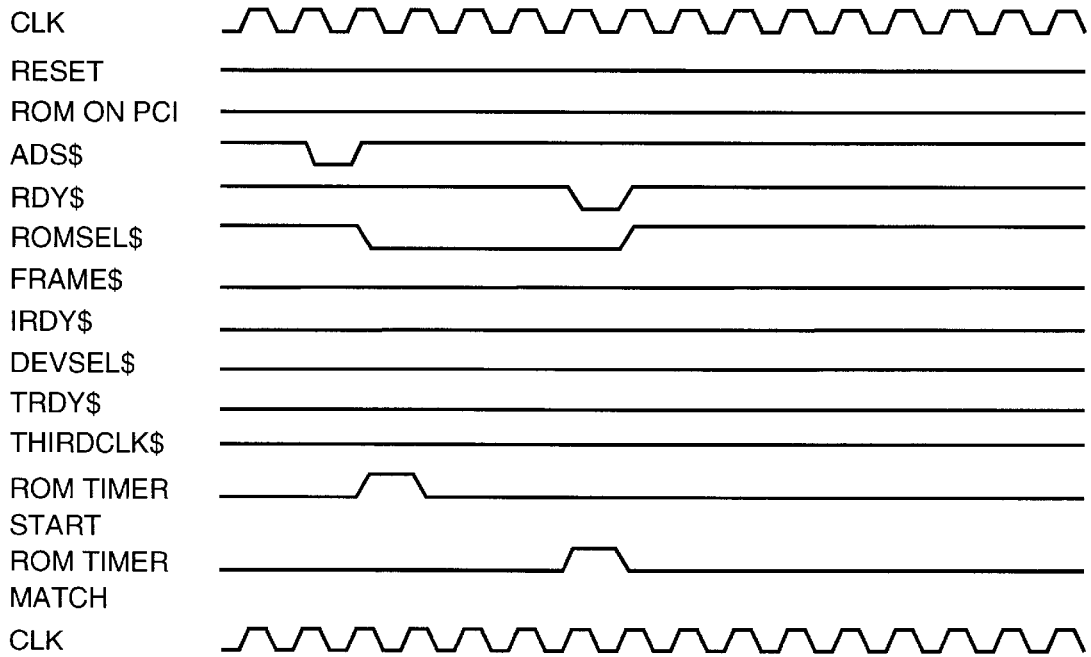

In all of these instances of FIGS. 2A, 2B and 2C, the ROM is on the PCI bus as indicated by the DEVSEL$ signal being returned within 3 CLK cycles. However, in FIG. 2D, it can be seen that after the FRAME$ signal goes low, the DEVSEL$ signal does not go low within 3 CLK cycles; therefore by logic which will be described presently, the ROM oh PCI bus is pulled low, indicating that the ROM is not on the PCI bus, but rather on the local bus and hence the CPU will read the initialization instructions from the RON on the local bus. It should also be noted that in this case a ROM timer start and a ROM timer match signal are generated when the THIRDCLK$ signal goes low, indicating the DEVSEL$ signal had not been returned within 3 CLK cycles. This will then configure the bus to operate on the following cycles as shown in FIG. 2E which shows how these various signals operate when the ROM on PCI bus is low, indicating that the ROM is on the local bus. This will continue until there is a reset signal generated. It should also be noted that if the DEVSEL$ signal goes low after three clock cycles, as shown dotted in FIG. 2D, this will have no affect on the ROM on PCI, since it has already been latched to low indicating ROM on the local bus.

Figure 3A:
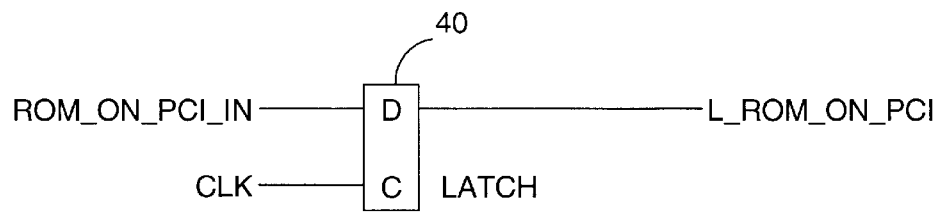
FIGS. 3A through 3C how devices for generating certain of the signal configurations.

Referring now to FIG. 3A, the logic for selection of the ROM on PCI high or low is shown very diagrammatically. A latch device 40 is provided which receives input signals as shown from chip 20, to output the ROM on PCI input signal which is described by equation (4) infra. If 3 CLK counts are received without the signal being returned on the DEVSEL$ signal, then the ROM on PCI signal will be driven low and latched low, indicating that the ROM is on the local bus. The ROM_ON_PCI logic equations for the latch device shown in FIG. 3A are as follows:

(1) ROM_ON_PCI_SET<=Reset;
(2) ROM_ON_PCI_RESET<=not THIRDCLK$ and not ROMSEL$;
(3) ROM_ON_PCI_IN<=(ROM_ON_PCI or ROM_ON_PCI_SET) and not ROM_ON_PCI_RESET;
(4) ROM_ON_PCI<=L_ROM_ON_PCI and not ROM_ON_PCI_RESET;

Note: All equations are written in VHDL..

Figure 3B:
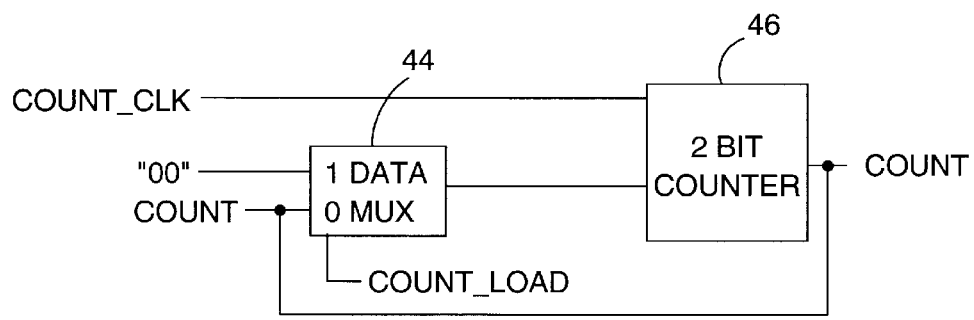
Figure 3C:
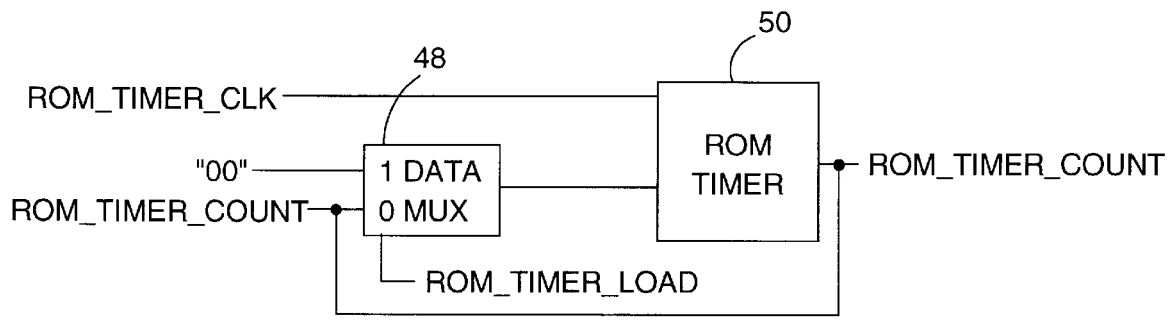

FIG. 3B shows the simple timer circuit including a multiplexor 44 and a 2-bit counter 46 for the number of clocks when DEVSEL$ has not been received from FRANE$. The count_CLK is described by equation (5) infra, and count load is described by equation (6) infra. The equations for the count_CLK logic shown in FIG. 3B are as follows:

(5) Count_CLK<=((DEVSEL$ and not ROMSEL$) or Reset or not FRAME$) and CLK;
(6) Count load<=Reset or (not FRAME$ and not ROMSEL$);
(7) THIRDCLK$<=(Count=3) and not ROMSEL$;

FIG. 3C shows a timer circuit having a ROM multiplexor 48 for setting ROM timer 50. The ROM timer logic is as follows:

(8) Rom_Timer_Enable<=RESET or (not ROMSEL$ and not ROM_ON_PCI);
(9) ROM_timer-CLK<=ROM_Timer_Enable and CLK;
(10) ROM_Timer_load<=RESET or ROM_Timer_Match;
(11) ROM_Timer_Match<=(ROM_Timer_count= ROM_access_timer_value) and not ROMSEL$ and not ROM_ON_PCI;

The ROM timer 50 is a counter. The ROM timer is used when ROM is not on the PCI bus 18 for a programmable ROM access time. The ROM_on_PCI signal is described by equation (13) supra. As seen in FIG. 2D and 2E, the ROM timer provides a delay so that the CPU 10 can read valid data from the ROM chip 16 which must be on the local bus 12. When the timer count matches the ROM_access_timer_value stored in MC/PBHB 20 logic, the MC/PBHB returns RDY$ active on behalf of the ROM chip 16 on the local bus 12, indicating completion of the cycle.

While the invention is described with some degree of particularity, various adaptations and modifications can be made without departing from the scope of the invention as defined in the appended claims.

What is claimed is:

1. An information handling system configured to detect a ROM chip containing CPU initialization instructions located on any one of a plurality of buses and accessing the detected ROM chip containing CPU initialization instructions, the information handling system comprising:

a CPU, a local bus to which the CPU is connected, a peripheral bus for connecting peripheral devices thereto, a first logic on the local bus to generate clock cycles over the local bus and the peripheral bus, a second logic on the peripheral bus to generate a device select signal on the peripheral bus, and a peripheral bus host bridge interconnecting the local bus and the peripheral bus, the peripheral host bridge including logic to provide for logically connecting the CPU during a first ROM CPU read cycle of CPU initialization to either (i) the peripheral bus in response to a first combination of the clock cycles and the device select signal detecting the location of the ROM chip on the peripheral bus for the CPU to access the ROM chip and the CPU initialization instructions, or (ii) the local bus in response to a second combination of the clock cycles detecting the location of the ROM chip on the local bus for the CPU to access the ROM chip containing the CPU initialization instructions, wherein the ROM chip containing the CPU initialization instructions is located on either the peripheral bus or the local bus.

2. A method of accessing CPU initialization instructions contained in a ROM chip located on any one of a plurality of buses, each bus of the plurality of buses having a bus protocol different from the bus protocol of each other bus of the plurality of buses, during a first ROM CPU read cycle of CPU initialization, in a personal computer system having a CPU, a local bus and a peripheral bus included in the plurality of buses, and the ROM chip, having the CPU initialization instructions, being present on either the local bus or the peripheral and being configured to write onto either the local bus or the peripheral bus, and the personal computer system being configured to generate clock cycles over the local bus and the peripheral bus and to generate a device select signal over the peripheral bus in the presence of the ROM chip on the peripheral bus, the method comprising the steps of:

generating the clock cycles over the local bus and the peripheral bus;

generating the device select signal over the peripheral bus;

detecting the presence of the ROM chip either on the peripheral bus in response to a first combination of the clock cycles and the device select signal or on the local bus in response to a second combination of the clock cycles; and logically latching the CPU during the first ROM CPU read cycle of CPU initialization to either the peripheral bus in response to the first combination of the clock cycles and the device select signal for accessing the ROM chip having the CPU initialization instructions, or to the local bus in response to the second combination of the clock cycles for accessing the ROM chip having the CPU initialization instructions.

3. An information handling system configured to detect a ROM chip containing CPU initialization instructions located, in the alternative, on any one of a plurality of buses and accessing the detected ROM chip containing CPU initialization instructions, the system comprising:

a CPU;

a local bus to which the CPU is connected;

a peripheral bus for connecting peripheral devices thereto;

a first logic on the local bus to generate clock cycles over the local bus and the peripheral bus;

a second logic on the peripheral bus for generating a device select signal on the peripheral bus; and a peripheral bus host bridge including logic to provide for either logically connecting the CPU to the ROM chip in response to a first combination of the clock cycles and the device select signal detecting the ROM chip on the peripheral bus or logically connecting the CPU to the ROM chip in response to a second combination of clock cycles detecting the ROM chip on the local bus, to thereby provide communication between the CPU and the ROM chip to initialize the CPU in accordance with the initialization instructions on the ROM chip.

* * * * *